Sept. 7, 1954     K. C. McBAIN ET AL     2,688,341
VALVE

Filed Jan. 7, 1950     3 Sheets-Sheet 1

INVENTOR.
KENNETH C. McBAIN
BY DONALD KEITH MacBAIN
Wm Edward Hann
Attorney

Sept. 7, 1954  K. C. McBAIN ET AL  2,688,341
VALVE

Filed Jan. 7, 1950  3 Sheets-Sheet 2

INVENTOR.
KENNETH C. McBAIN
BY DONALD KEITH MacBAIN
Wm Edward Hann
Attorney

Sept. 7, 1954 K. C. McBAIN ET AL 2,688,341
VALVE
Filed Jan. 7, 1950 3 Sheets-Sheet 3

INVENTOR.
KENNETH C. McBAIN
BY DONALD KEITH MacBAIN
W<sup>m</sup> Edward Hann
Attorney Patented Sept. 7, 1954

2,688,341

UNITED STATES PATENT OFFICE 2,688,341

VALVE

Kenneth C. McBain and Donald Keith MacBain, Long Beach, Calif., assignors to Paul A. Dewhirst, Los Angeles, Calif.

Application January 7, 1950, Serial No. 137,354

5 Claims. (Cl. 137—630.14)

This invention relates to a valve construction and more particularly to a liquid flow control valve wherein flow of liquid is completely unobstructed when the valve is open.

The general objects of the invention are to provide a valve construction wherein the flow capacity through the valve is in no way restricted by the valve head when it is in a fully opened position; to provide a valve body having an offset into which the valve head is moved in its open position; to provide a swingable or pivoted valve head whose swinging motion is translated into a rectilinear motion as the valve head moves into engagement with the seat; to provide a pivotal mounting for a valve head which in turn is pivoted thereon and yieldably held in a pre-determined position relative to the mounting whereby the head can swing on the mounting and approach the valve seat with a substantially rectilinear motion; to provide a valve structure wherein the complete closing of the valve is effected gradually and the usual hammering action is eliminated; and to provide a compound valve unit having more than one sealing means including sealing rings held by substantially identical and interchangeable retainers.

The above and other objects and advantages of the invention will more fully appear from the following description made in connection with the accompanying drawings wherein.

Figure 1:
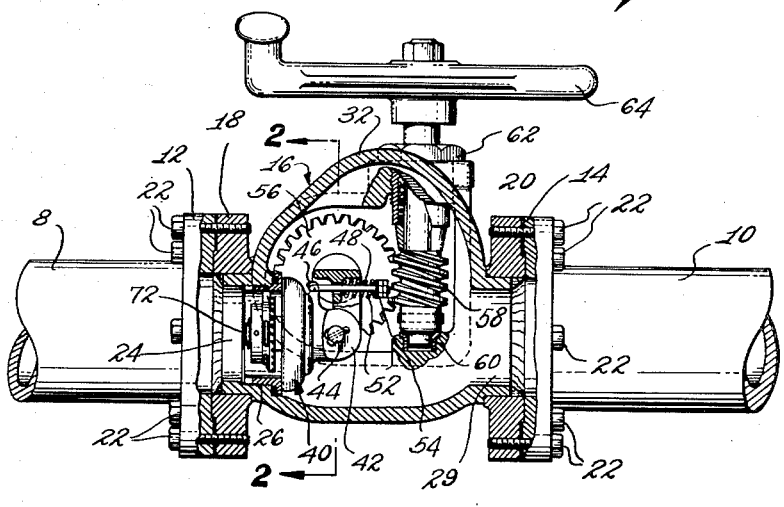
Fig. 1 is a view partially in side elevation and partially in vertical section of an embodiment of the invention.

In Fig. 1, I have illustrated a pair of adjacent pipe sections 8 and 10 which are provided with flanges 12 and 14. Positioned between the flanges 12 and 14 is a valve body 16 having end flanges 18 and 20 which are connected respectively to the pipe flanges 12 and 14 by studs 22. It will be seen that the valve body flanges 18 and 20 lie about the valve body openings 24 and 29 which are disposed in alignment and that there is a clear flow space in the valve body 16 which permits liquid to flow from one opening to the other.

Threadedly mounted in the valve body opening 24 is a valve seat 26 having an inwardly facing flat, vertical face 28. The seat 26 has a large central opening defined by a wall 30.

Figure 2:
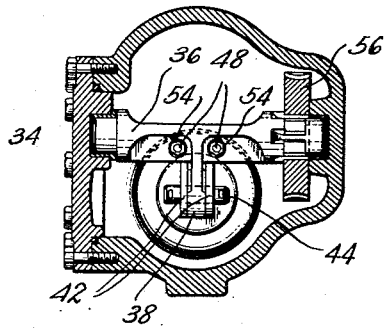
Fig. 2 is a section taken approximately on the line 2—2 of Fig. 1.

The valve body 16 has an upwardly extended dome-like portion 32, a portion of which is divided by a removable side plate 34 shown best in Fig. 2. Between the side plate 34 and the other side of the valve body 16 is a pivot shaft 36 having a generally laterally disposed crank arm 38 thereon.

A valve head assembly 40 is provided with a pair of spaced lugs 42 which lie at either side of the crank arm 38 and are pivotally connected thereto by a pin 44. Extending upwardly from the valve head 40 is a pair of hook-like lugs 46 which are engaged by a U-bolt 48 whose legs extend loosely through apertures 50 in the cross shaft 36. Compression springs 52 are imposed between a set of lock nuts 54 on each leg 48 and the cross shaft 36. These springs normally hold the valve head 40 in the position shown in Fig. 3 relative to the cross shaft 36. In this position the hook-like lugs 46 are in contact with the cross shaft. However, the springs 52 permit the valve head 40 to swing in a counterclockwise direction about the pivot pin 44 and relative to the cross shaft 36.

As shown in Fig. 2, a worm gear 56 is splined or keyed on one end of the cross shaft 36 and said worm gear is meshed with a worm 58 whose lower end 60 is journaled in a lower portion of the valve body 16 and whose upper end extends upwardly through a packing gland 62 to a point above the valve body 16 to receive a hand wheel 64.

The valve head 40 includes a main casting 66 having a flange 68 with a flat vertical surface 70. The casting 66 has a horizontal extension 72 which is provided with a series of longitudinally disposed grooves or channels 74 which extend from the left hand end of the extension 72 to a point adjacent the flange 68.

The extension 72 of the valve head casting 66 is externally threaded to receive a plate 76 which had a series of arcuate apertures 78 therethrough The upper portion of the plate 76 is provided with an upwardly extending guide element 80 whose outer edge 82 is on the same arc as the inner wall 30 of the valve seat 26.

Figure 7:
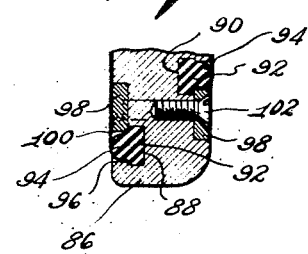
Fig. 7 is an enlarged fragmentary sectional detail of a portion of the valve head.

The extension 72 of the valve head casting 66 has a smooth portion 84 upon which is slidably mounted a centrally apertured valve disc 86. This disc, as shown in Fig. 7 is provided with T-shaped grooves 88 and 90 which are formed in the opposite vertical faces of the disc and are adapted to removably receive O-rings 92.

The O-rings 92 include wider base portions and outwardly extending annular beads 94 which project a slight distance beyond the respective faces of the valve disc 86. Adjacent the beads 94 rolled corners 96 are formed in the valve disc which produce surfaces diverging from the opposite sides of the T-shaped grooves 88.

The O-rings 92 are retained in the T-shaped grooves 88 by retainer rings 98 which partially define said T-shaped grooves. These rings have rounded edge portions 100 which are complementary to and opposite from the rounded corners 96. As a result, the beaded portions 94 of the O-rings 92 will not become pinched and chewed when the beads are pressed against adjacent valve sealing surfaces. The retainer rings 98 are removably secured to the valve disc 86 by means of suitable studs 102.

Figure 6:
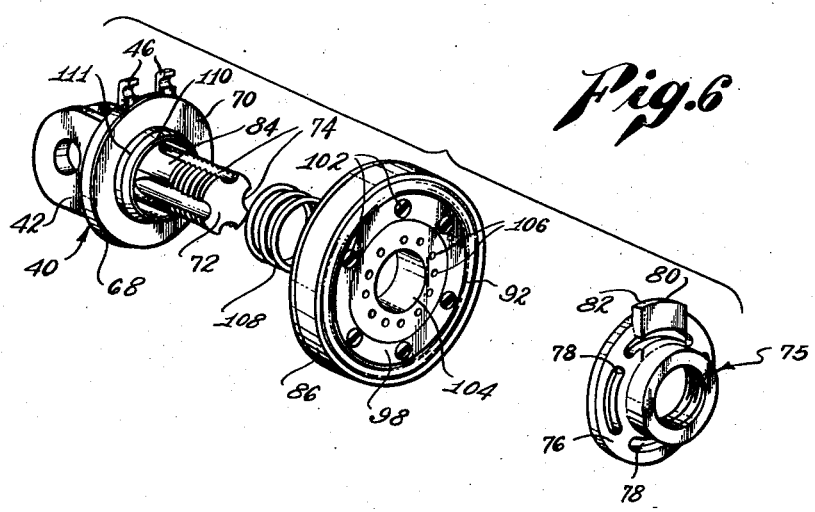
Fig. 6 is an exploded view of the valve head.

As best shown in Fig. 6, the valve disc 86 is provided with a central aperture 104 which slidably receives the smooth portion 84 of the valve head casting extension 72. About this central opening is a series of axially disposed passages 106 which extend entirely through the valve disc. Inwardly from said passages a compression spring 108 is interposed between the valve disc 86 and the adjacent surface of the valve head flange 68, thereby yieldably urging these two parts away from each other and against the adjacent flat edge surface 77 of the apertured plate 75. The plate 75 thus holds the disc 86 in the precise position for even seating with the valve seat surface 28.

Figure 4:
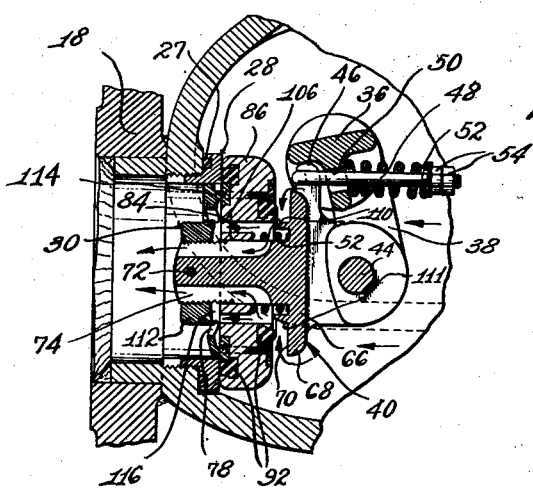
Fig. 4 is an enlarged fragmentary, longitudinal, vertical sectional view illustrating the valve in a partially closed position.
Figure 5:
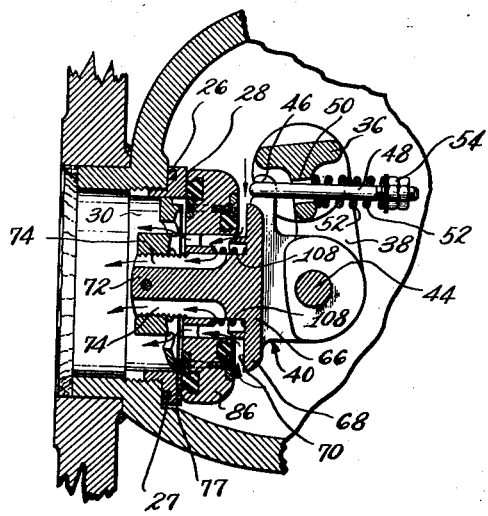
Fig. 5 is a view similar to Fig. 4 with the valve moved to a more nearly closed position.

The central opening 104 through the valve disc 86 is enlarged at the right hand side as viewed in Figs. 4 and 5 to receive an annular tapered flange 110 which serves to gradually restrict flow through the valve disc as the member 68 is pushed toward the valve disc against the action of the spring 108.

The threaded portion of the horizontal valve casting extension 72 has a plate 75 thereon and the right hand side of said plate as viewed in Figs. 4 and 5, is shown to be concave. Said right hand side is also provided with a circular flange 114 which is concentric to the center of the disc and defines a flow space 116 which permits liquid to flow through the valve disc apertures 106 and thence through the arcuate apertures 78 in the disc 75.

Referring back to the valve seat element 26 it should be noted that a sealing ring 27 can be utilized to prevent leakage between the valve seat member and the body of the valve casing.

Figure 3:
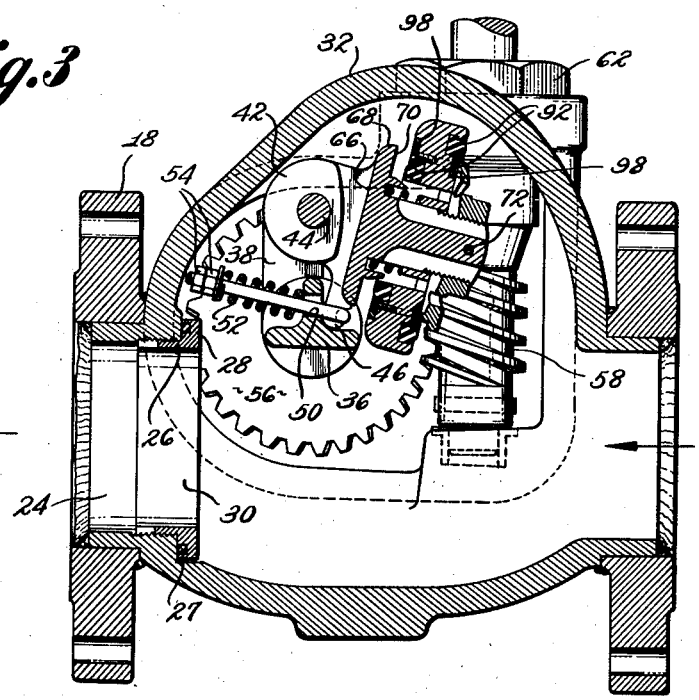
Fig. 3 is an enlarged longitudinal, vertical sectional view through the valve structure in its open position.

When the valve is in the position shown in Fig. 3 there is a free flow passage provided between the valve body openings 24 and 29 for the purpose of expansion. The valve body opening 29 can be considered the inlet and the opening 24 the outlet. The valve head assembly is in the upward offset 32 of the valve body 16 and entirely out of the line of flow.

When the valve is closed the hand wheel 64 is rotated to turn the worm 58, the worm wheel 56 and the cross shaft 36, whereby the valve head assembly 40 will swing in a clockwise direction downwardly and thence toward the valve seat member 26. As the valve head assembly approaches the seat the guide element 80 on the disc 76 will enter the opening in the valve seat member 26. This will align the valve head assembly with the seat and change the movement of the valve head assembly from an arcuate to a substantially rectilinear movement.

As the cross shaft 36 is further rotated, the left hand O-ring 92 will engage the valve seat surface 28 and produce a seal at that point. This is the position illustrated in Fig. 4.

Fig. 5 illustrates a one-half closed position of the valve in which the valve head casting 66 has begun to move to the left while the valve disc 86 is held stationary against the valve seat member 26. In the positions of Figs. 4 and 5 there will be a continued flow of liquid around the flange 68 of the valve head casting 66 and through the passages 106 in the valve disc 86 and thence through the arcuate apertures 78 in the disc 76.

As the valve casting 66 continues to move to the left the tapered flange 110 thereon will begin to enter the central aperture 104 of the valve disc and gradually reduce the flow of liquid until the vertical surface 70 on the valve head flange 68 forms a seal with the right hand O-ring 92. This completely closes the valve assembly and such closure is accomplished without the hammering action in the liquid feed line which ordinarily results when a relatively high pressure line is closed.

The flange 110 has a cylindrical outer base surface 111 which is just slightly smaller in diameter than the central opening 104 of the valve disc. As the tapered portion of the flange 110 enters the opening 104 (after seating of the O-ring 94 against the valve seat surface 28), flow of liquid is gradually reduced.

When the cylindrical surface 111 enters the disc opening 104 there is a certain amount of bleeding which takes place between said surface and the wall of the opening 104 which eliminates erosive or "wire-drawing" action between the face 70 of the valve head casting flange 68 and the O-ring seal 92. This is an important feature in high pressure liquid lines.

For best results, it is preferred that the flow capacity through the opening 104 approximately balance the flow cut-off by seating of the O-ring 94 against the seat surface 28.

As stated above, the hook-like members 46 which extend upwardly from the valve head flange 68 are normally held in contact with the cross shaft 36 under the influence of the spring 52. However, when the guide element 80 on the disc 76 enters the central opening of the valve seat members 26, the valve head assembly 40 will tilt relative to the cross shaft 36 and this tilting movement is permitted by compression of the spring 52. Naturally, when the valve head assembly is retracted from the valve seat, said valve head assembly will tilt in a reverse direction under the influence of the spring and the hooks 46 will again contact the cross shaft to hold the valve head assembly in a fixed position as it is rotated counterclockwise and upwardly into the valve body offset 32.

Attention is again called to the structure and arrangement of the O-rings 92, their retainer rings 98 and the rounded edges on those portions of the valve disc 86 and retainer rings 98 which define the entrances of the T-shaped slots 88. These rounded edges greatly increase the life of the O-rings by preventing them from becoming pinched between adjacent portions of the valve structure when they seat against sealing surfaces and are spread radially as a result of such seating action.

It will, of course, be understood that various changes can be made in the arrangements and proportions of the various parts without departing from the spirit of the invention.

I claim as my invention:

1. In a valve, a valve body having an apertured seat portion, a valve operating member movably supported by the valve body, a valve head having a seat engaging portion, said valve head having a passage therethrough, a cushioning valve movable relative to the valve head to open and close the passage, the cushioning valve being supported by the operating member and the valve head being supported by the cushioning valve, and a yielding device interposed between the valve head and the cushioning valve to yieldably hold the cushioning valve open, the valve head being engageable with its seat prior to movement of the cushioning valve to its closed position, the valve head and cushioning valve having a common direction of closing movement 2. In a valve, a body having an apertured valve seat carried thereby, a valve head swingably mounted in said body and having a normal position of rest relative to said body, a portion of said valve head being movable into contact with said seat, another portion of said valve head fitting in the aperture in said seat in contact with the wall of the aperture, the swingable mounting of said valve head having an arcuate path of movement, a tangent to which is coincident with the axis of said aperture and permitting limited, substantially rectilinear movement of said valve head toward and away from said seat, and a spring device yieldably maintaining said valve head in said normal position of rest.

3. In a valve, a valve body having an apertured seat portion, a valve head movable into and out of engagement with said seat and including a portion shaped to contact said seat, said head having a passage therethrough with a cushioning valve therein, said cushioning valve including a closing element movably connected to the remainder of said valve head to open and close said passage, said valve head and said cushioning valve having the same direction of closing movement, an operating member for the entire head and cushioning valve assembly, said operating member being connected to the cushioning valve closing element, said valve head being movably supported by the cushioning valve, and an expansion spring interposed between said cushioning valve closing element and the remainder of said head to yieldably hold said cushioning valve in open position.

4. In a valve, a valve body having an apertured seat portion, a valve head movable into and out of engagement with said seat and including a portion shaped to contact said seat, said head having a passage therethrough with a cushioning valve therein, said cushioning valve including a closing element movably connected to the remainder of said valve head to open and close said passage, said valve head and said cushioning valve having the same direction of closing movement, an operating member for the entire head and cushioning valve assembly, said operating member being connected to the cushioning valve closing element, said valve head being movably supported by the cushioning valve, said passage through said head being cylindrical, and the closing element of said cushioning valve having a tapered portion entrant into the cylindrical passage through said valve head to gradually reduce the flow through said passage when said closing element is moved into said passage.

5. The structure in claim 4, and said closing element and the remainder of the valve head structure having cooperating sealing portions independent of the cushioning structure for completely closing the passage through said valve head.

References Cited in the file of this patent

UNITED STATES PATENTS

| Number | Name | Date |
|---|---|---|
| 604,399 | Keenan | May 24, 1898 |
| 911,603 | Miller | Feb. 9, 1909 |
| 1,174,959 | Bean | Mar. 14, 1916 |
| 1,592,748 | Slagle | July 13, 1926 |
| 1,650,077 | Lamb | Nov. 22, 1927 |
| 1,699,085 | Vera | Jan. 15, 1929 |
| 1,822,655 | Hamilton | Sept. 8, 1931 |
| 1,897,678 | Schiorring | Feb. 14, 1933 |
| 1,922,225 | Wickersham | Aug. 15, 1933 |
| 1,998,913 | Wheaton | Apr. 23, 1935 |
| 2,166,484 | Carlson | July 18, 1939 |

FOREIGN PATENTS

| Number | Country | Date |
|---|---|---|
| 545,142 | Germany | Feb. 26, 1932 |
| 364,889 | Italy | Nov. 1938 |